(12) United States Patent
Shoemaker et al.

(10) Patent No.: US 8,444,123 B2
(45) Date of Patent: *May 21, 2013

(54) SUSPENSION SYSTEM HAVING ACTIVE COMPENSATION FOR VIBRATION

(75) Inventors: Jim Milton Shoemaker, Horicon, WI (US); Ronnie Dean Stahlhut, Bettendorf, IA (US); Troy Eugene Schick, Cedar Falls, IA (US); Bernard Edwin Romig, Illinois City, IL (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/901,272

(22) Filed: Oct. 8, 2010

(65) Prior Publication Data

US 2011/0024601 A1 Feb. 3, 2011

Related U.S. Application Data

(63) Continuation of application No. 11/502,185, filed on Aug. 10, 2006, now Pat. No. 7,887,033, which is a continuation of application No. 11/503,015, filed on Aug. 10, 2006, now Pat. No. 7,694,946.

(51) Int. Cl.
*F16M 1/00* (2006.01)
(52) U.S. Cl.
USPC ............................................ 267/136
(58) Field of Classification Search
USPC .............. 267/64.11, 131, 136; 296/65.02, 296/68.1, 190.07; 196/190.07; 297/344.16, 297/344.19, 339; 180/89.12; 248/550, 631, 248/638
See application file for complete search history.

(56) References Cited

U.S. PATENT DOCUMENTS

| | | | |
|---|---|---|---|
| 3,531,666 A | 9/1970 | Ford | |
| 3,552,271 A | 1/1971 | Suggs et al. | |
| 3,701,499 A * | 10/1972 | Schubert et al. | ........... 244/17.27 |

(Continued)

FOREIGN PATENT DOCUMENTS

| | | |
|---|---|---|
| DE | 2736242 | 2/1979 |
| EP | 1577156 | 9/2005 |
| EP | 1652724 | 1/2008 |
| WO | 2004/101311 | 11/2004 |

OTHER PUBLICATIONS

Linear Motors Application Guide (online). AEROTECH (retrieved on Jul. 14, 2006). Retrieved from the Internet: <URL: http://aerotech.com/products/PDF/LMAppGuide.pdf>.

*Primary Examiner* — Robert A Siconolfi
*Assistant Examiner* — Stephen Bowes
(74) *Attorney, Agent, or Firm* — Yee & Associates, P.C.

(57) ABSTRACT

A suspension system for a seat of a vehicle comprises a base, a linkage, and a seat attached to the base via the linkage. A pneumatic shock absorber provides a respective resistance level against movement of the seat with respect to the base based on a corresponding pressure level of air or gas within the pneumatic shock absorber. A set of cylindrical members are spaced apart beneath the seat. A tension member is arranged to engage the cylindrical members. The tension member is attached to the seat via a bracket. An electric motor is capable of driving one of the cylindrical members. A first sensor is arranged to detect first sensor data associated with an instantaneous position of the seat versus time. A controller generates a first control signal for the electric motor to change a height of the seat in opposition to a change in the instantaneous position of the seat and a second control signal to change the pressure level.

8 Claims, 5 Drawing Sheets

U.S. PATENT DOCUMENTS

| | | | |
|---|---|---|---|
| 4,158,160 A | | 6/1979 | Meiller |
| 4,363,377 A | * | 12/1982 | Van Gerpen .................. 180/282 |
| 4,638,982 A | | 1/1987 | Misher et al. |
| 5,004,206 A | | 4/1991 | Anderson |
| 5,222,709 A | | 6/1993 | Culley, Jr. et al. |
| 5,735,509 A | | 4/1998 | Gryp et al. |
| 5,794,909 A | * | 8/1998 | Platus et al. .................. 248/550 |
| 5,975,508 A | | 11/1999 | Beard |
| 6,264,163 B1 | | 7/2001 | Ivarsson |
| 6,322,060 B1 | * | 11/2001 | Mayama et al. .............. 267/136 |
| 6,371,459 B1 | | 4/2002 | Schick et al. |
| 6,467,748 B1 | | 10/2002 | Schick et al. |
| 6,616,116 B1 | | 9/2003 | Rochau et al. |
| 6,886,650 B2 | | 5/2005 | Bremner |
| 6,935,693 B2 | | 8/2005 | Janscha et al. |
| 7,575,206 B2 | | 8/2009 | Meier et al. |
| 7,694,946 B2 | | 4/2010 | Shoemaker et al. |
| 7,887,033 B2 | * | 2/2011 | Shoemaker et al. .......... 267/136 |
| 2005/0110243 A1 | | 5/2005 | Meier et al. |
| 2006/0237885 A1 | | 10/2006 | Paillard et al. |

* cited by examiner

US 8,444,123 B2

SUSPENSION SYSTEM HAVING ACTIVE COMPENSATION FOR VIBRATION

This application is a continuation of application Ser. No. 11/502,185, filed Aug. 10, 2006 now U.S. Pat. No. 7,887,033, status pending, which in turn is a continuation of application Ser. No. 11/503,015, filed Aug. 10, 2006, status issued on Apr. 13, 2010, as U.S. Pat. 7,694,946.

FIELD OF THE INVENTION

This invention relates to a suspension system having active compensation for vibration.

BACKGROUND OF THE INVENTION

Suspension systems for seats may use hydraulic damping to reduce the vibration of a seat of a vehicle. However, the operator of the vehicle may be subjected to vibrations at higher frequencies than the response rate of the hydraulic damping. For example, if the vehicle is operated at sufficiently high speeds, the hydraulic damping may fail to attenuate the vibrations from traveling over the ground; hence, the operator may experience a bumpy and jarring ride. Thus, there is a need to provide active compensation for vibration.

SUMMARY OF THE INVENTION

A suspension system for a seat of a vehicle comprises a base, a linkage, and a seat attached to the base via the linkage. A pneumatic shock absorber provides a respective resistance level against movement of the seat with respect to the base based on a corresponding pressure level of air or gas within the pneumatic shock absorber. A set of cylindrical members (e.g., gears) are spaced apart beneath the seat. A tension member is arranged to engage the cylindrical members. The tension member is attached to the seat via a bracket. An electric motor is capable of driving one of the cylindrical members. A first sensor is arranged to detect first sensor data associated with an instantaneous position of the seat versus time. A controller generates at least one of a first control signal for the electric motor to change a height of the seat in opposition to a vibration-induced change in the instantaneous position of the seat and a second control signal to change the pressure level.

DESCRIPTION OF THE PREFERRED EMBODIMENT

Figure 1:
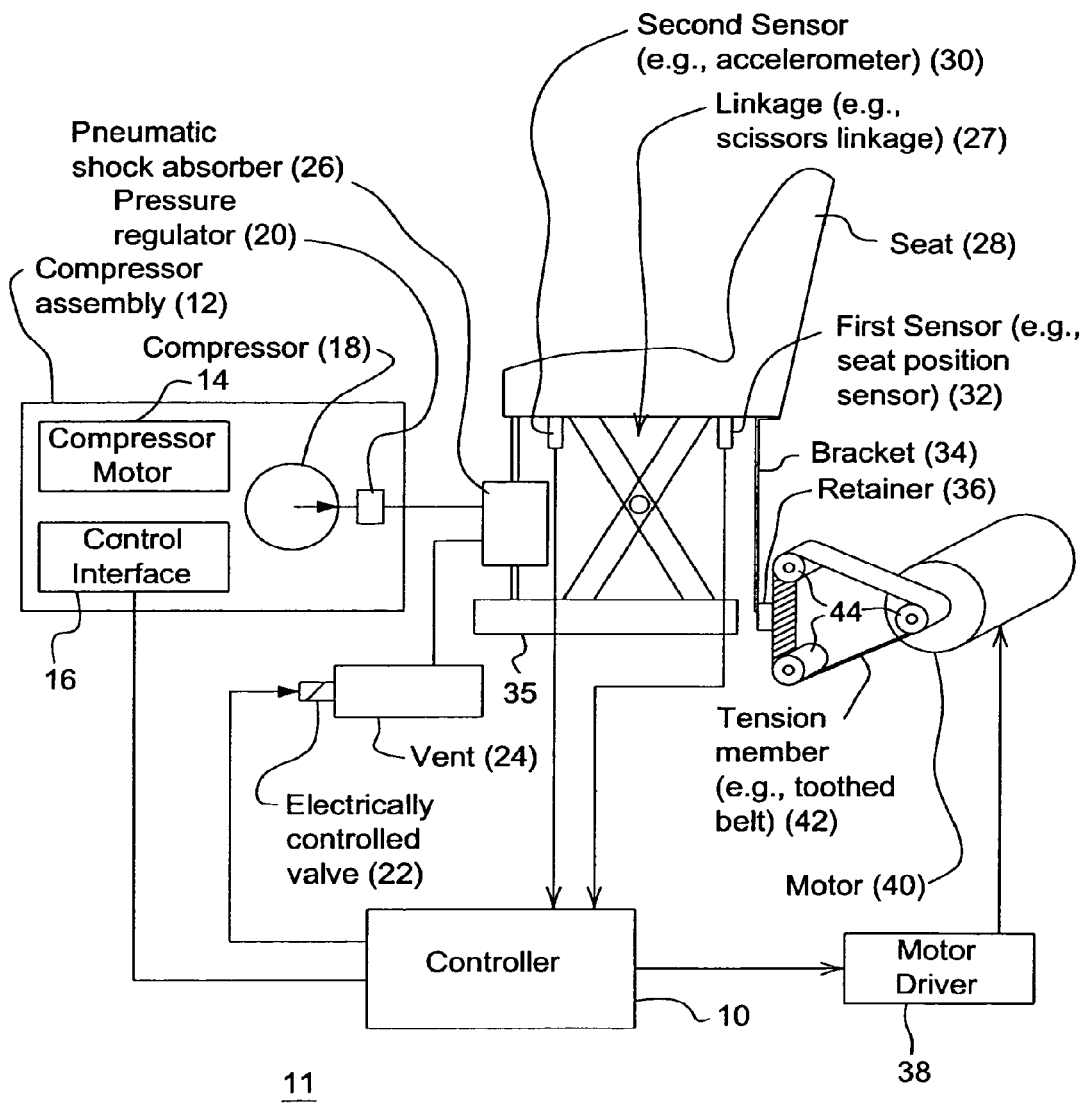
FIG. 1 is a first embodiment of a suspension system for a seat of a vehicle.

FIG. 1 illustrates one embodiment of a suspension system 11 for a seat 28 of a vehicle. The suspension system 11 comprises a base 35, a linkage 27, and a seat 28 attached to the base 35 via the linkage 27. In one embodiment, the linkage 27 may comprise a scissors support system, although any suitable support system may be used that allows vertical adjustment of the seat 28. A pneumatic shock absorber 26 provides a respective resistance level against movement of the seat 28 with respect to the base 35 based on a corresponding pressure level of air or gas within the pneumatic shock absorber 26. A set of cylindrical members 44 (e.g., gears, pulleys, sprockets, spools or cog wheels) are spaced apart beneath the seat 28. A tension member 42 is arranged to engage the cylindrical members 44. The tension member 42 is operably coupled to the seat 28 via a retainer 36 and bracket 34. An electric motor 40 is capable of driving one of the cylindrical members 44. A first sensor 32 is arranged to detect first sensor data associated with an instantaneous position of the seat 28 versus time or the vehicle. A second sensor 30 provides second sensor data associated with an instantaneous velocity or instantaneous acceleration of the seat 28. A controller 10 generates at least one of a first control signal and a second control signal. The controller 10 may transmit the first control signal to the electric motor 40 or the motor driver 38 to provide a corrective change height of the seat 28 in opposition to a vibration-induced change in the instantaneous position of the seat 28. The controller 10 may transmit the second control signal to the compressor assembly 12 or the pressure regulator 20 to change the pressure level. For example, controller 10 instructs the motor 40 or motor driver 38 to change the position of the seat in accordance with a compensation movement (e.g., vertical height movement) with a compensation frequency or frequencies that approximate a detected vibrational frequency or frequencies detected by the sensors (30, 32), where the compensation movement has a generally opposite phase to the phase of the detected vibrational frequency or frequencies.

A compressor assembly 12 provides compressed air or gas to pressurize an interior chamber of the pneumatic shock absorber 26 to a desired pressure level. The compressor assembly 12 comprises a control interface 16, a compressor motor 14, a compressor 18, and pressure regulator 20. The control interface 16 supports communication with the controller 10 and may convert control data to a control signal suitable for controlling at least one of a compressor motor 14 and a pressure regulator 20. For example, the control interface 16 may comprise a switch or relay for enabling or disabling the compressor motor 14, or for adjusting a gas pressure or air pressure of an outlet associated with the pressure regulator 20. The control interface 16 is electrically or electromagnetically coupled to the compressor motor 14. A compressor output port of the compressor 18 may be coupled to a pressure regulator 20, or the combination of a tank and a pressure regulator 20. The pressure regulator 20 may be associated with a solenoid, a servo-motor, an electro-mechanical device, an electro-hydraulic device, or another control device for controlling a setting or valve opening of the pressure regulator 20. The controller 10 may provide a control signal to the control device of the pressure regulator 20 to adjust an output pressure of gas or air, or the pressure regulator 20 may supply compressed gas or air at a fixed pressure level. A regulator outlet of the pressure regulator 20 or the compressor assembly 12 is coupled to the pneumatic shock absorber 26 via tubing, flexible tubing, a hose, or another conduit for pressurized air or gas. During operation, the pressure level at the regulator outlet is generally greater than or equal to the pressure level within an internal chamber of the pneumatic shock absorber 26.

The pneumatic shock absorber 26 may comprise an airbag, a pneumatic air spring, or another damping mechanism that uses compressed air or gas. An internal chamber of the pneumatic shock absorber 26 is configured to contain pressured air or gas. An inlet to the internal chamber may be fed by an output of the compressor assembly 12 or the regulator outlet. An outlet to the internal chamber may be associated with a vent 24. In one embodiment, the vent 24 comprises an electro-hydraulic valve, a servo-motor controlled valve, or a solenoid controlled valve for venting air or gas from the internal chamber to relieve or reduce the pressure level of the air or gas within the internal chamber (of the pneumatic shock absorber 26). Similarly, the vent 24 may comprise the combination of a valve and an electro-mechanical device, a servo-motor, a solenoid, or another device 22 for regulating the valve, the extent of a valve opening, or its opening or closure.

In an alternate embodiment, the combination of the compressor assembly 12, the pneumatic shock absorber 26, and the vent 24 may be replaced by a charged pneumatic shock absorber. A charged pneumatic shock absorber is filled with compressed gas or air at a desired degree of pressure. For example, the charged pneumatic shock absorber may be filled with compressed air or gas to a desired pressure level at a factory or during the manufacture of the charged pneumatic shock absorber. Some configurations of the charged pneumatic shock absorber may be sealed to not allow further pressurization or re-pressurization of the internal chamber. Accordingly, if the charged pneumatic shock absorber is used, there is no need for the controller (e.g., controller 10) to generate a second control signal for changing its pressure level.

A first sensor 32 may comprise a position sensor that is capable of outputting position data, or position data versus time data. The first sensor 32 may comprise a transducer (e.g., Hall effect transducer), a magneto resistive sensor, a magnetic field sensor, a laser transceiver, an optical sensor, or another device for determining the relative position of the seat 28 (or a member attached thereto) to a fixed reference (e.g., the base 35 or a floor of the vehicle). If a magneto resistive sensor or magnetic field sensor is used, a magnet or magnet assembly is spaced apart from the sensor such that the sensor may detect changes in the magnetic field (e.g., intensity or magnitude) that correspond to changes in movement of the seat 28. The first sensor 32 is secured to the seat 28 or a portion that moves with the seat 28, and the magnet or magnet assembly is secured to a stationary portion or base that does not move with the seat 28, or vice versa. Stationary mounts may extend from the base 35 for supporting the magnet or magnet assembly, for example. The first sensor 32 or the controller 10 may be associated with a clock or timer to provide temporal data that corresponds to respective detected position data. An output of the first sensor 32 is coupled to an input of the controller 10 to provide first sensor data or a first sensor signal to the controller 10.

In an alternative embodiment, the first sensor 32 may be realized by the combination of an accelerometer and an integrator. Alternatively, the controller 10 may comprise a data processing module or integrator module for determining an instantaneous position of the seat from instantaneous vertical acceleration. Although the first sensor 32 is secured to a bottom of the seat 28 as shown, in an alternative embodiment the first sensor 32 may be attached to another portion of the seat 28, the linkage 27, or a stationary mount extending from the base 35. If the first sensor 32 is mounted on a stationary mount extending from the base 35, a magnet or magnet assembly may be mounted in proximity on or in the seat 28 or on the linkage 27.

The second sensor 30 may comprise an accelerometer. For example, an accelerometer may comprise a micro-electromechanical device with a member that moves in response to motion of the device and produces a change in resistance, capacitance, inductance, voltage or current indicative of the acceleration of the device. The accelerometer is associated with circuitry for detecting a change in resistance, capacitance, inductance, voltage or current in accordance with the design parameters of the accelerometer. An acceleration output of the accelerometer may be coupled to an input of one or more integrators to determine a velocity or a position associated with the acceleration output. An output of the second sensor 30 is coupled to an input of the controller 10 to provide second sensor data or a second sensor signal to the controller 10.

Although the second sensor 30 (e.g., the accelerometer) is secured directly or indirectly (e.g., to a bottom of the seat 28) as shown in FIG. 1, in an alternate embodiment the second sensor 30 may be secured to a base or another portion of the vehicle such that the second sensor 30 measures the vertical acceleration (e.g. instantaneous vertical acceleration) of the vehicle, rather than that of the seat 28. Because the seat 28 may react, move or accelerate with a lag time to the vertical acceleration of the vehicle, the response time of the active compensation of the motor 40 and tension member 42 may be reduced by using acceleration measurements associated with the vehicle or the base, as opposed to the seat 28.

In one configuration, the second sensor 30 may be used to establish the amplitude (or maximum compensating displacement) of the active damping response of the motor 40. For example, the second sensor 30 may detect a peak vertical position and a lowest vertical position (or positional amplitude versus time) of the seat as those positions of substantially no vertical acceleration or a vertical acceleration approaching zero for the seat 28.

A controller 10 controls the damping response or resistance level to motion of the pneumatic member based on one or more of the following: first sensor data of the first sensor 32, a first sensor signal of the first sensor 32, second sensor data of the second sensor 30, and a second sensor signal of the second sensor 30. In one embodiment, the controller 10 may change the passive damping response of the pneumatic shock absorber 26 by adjusting the pressure level within its internal chamber. For example, the controller 10 may change the passive damping response of the pneumatic shock absorber 26 by using the compressor assembly 12 to increase the pressure level within the internal chamber or by using the vent 24 to reduce the pressure level within the internal chamber. For example, the controller 10 may change the passive damping response of the pneumatic shock absorber 26 by adjusting a pressure level of the pressure regulator 20. Such an increase or reduction in the pressure level may be carried out to provide a desired degree of passive damping of vibration of the seat 28.

The motor 40 may comprise a stepper motor, a rotary motor, a direct current (DC) motor 40, or an alternating current (AC) motor.

A stepper motor is generally designed to step to a limited number of discrete rotational positions or incremental angular steps based on one or more control signals from the motor driver 38. Accordingly, a stepper motor may provide highly accurate changes in the position in the seat 28 to actively compensate for vibration of the seat 28 or vehicle. A stepper motor may comprise an internal rotor with permanent magnets or a ferrous core with poles controlled by a set of external magnets that are switched electronically. The rotor of a stepper motor may turn forwards or backwards based on the sequence in which windings of the motor are energized or de-energized.

The motor driver 38 may facilitate control of the motor 40 to change or reverse the rotational direction of the motor 40 and to change the speed of the motor 40. If the motor 40 is a stepper motor, the motor driver 38 may be configured as a stepper motor driver. A stepper motor driver may selectively energize one or more windings to direct the motor 40 to one or more desired positions versus time. The windings may energized completely (e.g., to achieve saturation of the magnetic field) or may be energized partially to achieve the desired position or rotational direction.

If the motor 40 is a DC motor, the motor driver 38 may reverse the rotational direction of the motor 40 by changing the polarity of the electrical energy (e.g., voltage) applied to the motor 40 or the windings; the motor driver 38 may vary the speed of the motor 40 by varying the voltage level applied to the motor 40. The speed of a DC motor is generally proportional to the voltage applied to the DC motor. The motor driver 38 may comprise a resistive network or variable voltage output device for a DC motor. If the motor 40 is an AC motor, the motor driver 38 may apply an alternating current signal or pulse width modulated signal, for example. The rotational speed of an AC motor is generally proportional to the frequency (or pulse frequency and width) of the control signal output by the motor driver 38.

As shown in FIG. 1, the motor 40 is associated with a set of three cylindrical members 44 (e.g., gears, sprockets, pulleys, or cogged wheels). The cylindrical members 44 may be supported by support members that extend from the base, for instance. In one embodiment, the tension member 42 may engage the cylindrical members 44, such that the tension member 42 has a generally triangular profile. The tension member 42 may comprise a chain, a belt, a cog timing belt, a cable, a belt with teeth, a serrated belt, a belt with cogs, or the like. A retainer 36 is attached to (e.g., may interlock with) a generally vertical portion of the tension member 42. In turn, the retainer 36 is secured to a bracket 34 connected to the seat 28. Accordingly, the movement of the motor 40 may cause the retainer 36; hence, the seat 28 to move upward or downward by a desired amount and at a desired time to actively dampen vibrations of the seat 28. The motor 40 may be rotated in one rotational direction for upward movement of the seat 28 and in the opposite rotational direction for downward movement of the seat 28.

The controller 10 sends a control signal (e.g., a first control signal or second control signal) or control data to the motor driver 38 based on at least one or more of the following input data: first sensor data, a first sensor signal, second sensor data, and a second sensor signal. The controller 10 generates a control signal to dampen or reduce the vibrations of the seat 28 at one or more detected frequencies by the sensors (30, 32). Further, the motor driver 38 and motor 40 can move the seat 28 to respond to detected frequencies of vibration less than, equal to, or greater than 2 Hertz. In contrast, hydraulic damping may be limited to vibrational frequencies of less than 2 Hertz. The controller 10 cooperates with the motor controller 10 to produce movement of the seat 28 that is generally out of phase (e.g., approximately 180 degrees of phase offset at a given corresponding vibrational frequency) with the vibrational frequency or frequencies detected via the first sensor 32 and the second sensor 30.

The motor 40 is capable of providing active damping in response to vibrations transmitted from the vehicle traversing the ground and wherein the pneumatic shock absorber 26 is capable of providing passive damping in response to the vibrations. In one embodiment, the level of passive damping of the pneumatic shock absorber 26 is proportional to a weight of an operator who occupies the seat 28 based on sensor data from the first sensor 32, the second sensor 30, or both, when the vehicle is stationary or when a speedometer falls below a minimum value. Accordingly, the level of passive damping may be kept uniform (e.g., for an entire operator session), unless there is a change in the operator, whereas the controller 10 may control the active damping of the motor 40 to compensate for vibrations associated with the terrain. In one example, during or after starting of a vehicle, as a weight of an operator obtained by one or more sensors (e.g., 30, 32), or otherwise, increases with a respect to a reference operator weight, the controller 10 increases proportionally the level of passive damping or increases the pressure level of air or gas within the pneumatic shock absorber 26 (e.g., the output of the pressure regulator 20). In another example, during or after starting of a vehicle, as a weight of an operator obtained by one or more sensors (e.g., 30, 32), or otherwise, decreases with respect to a reference operator weight, the controller 10 decreases proportionally the level of the passive damping or reduces the pressure level of air or gas within the pneumatic shock absorber 26 (e.g., the output of the pressure regulator 20). The first sensor 32 may be used to estimate an operator weight of the operator. If a spring constant or motion equations of the pneumatic shock absorber 26 or an auxiliary damping spring are known, the measured downward displacement of the seat 28 in an occupied state from an unoccupied state is generally proportional to an operator weight of the operator. The compensation and resistance to motion of the motor 40 is disabled briefly during the measurement of the downward displacement of the seat as an operator is seated, for example.

The reference operator weight may be inputted by a user via the controller 10 or programmed into the controller 10 as a default or factory setting (e.g., average male weight in country of use), for example.

In one embodiment, the controller 10 maintains a sum of the active damping (e.g., opposing movement in response to vibrational movement of the seat 28) and passive damping (e.g., resistance to vertical vibrational movement of the seat 28) that is generally constant over a time interval (e.g., a lead time interval) to adjust the proportion or ratio of active damping to passive damping. Accordingly, as controller 10 increases passive damping by increasing the pressure level of the internal chamber of the pneumatic shock absorber 26 during the time interval, the controller 10 reduces active damping by decreasing the amplitude of position changes of the motor 40 during the time interval (e.g., lead time interval) to maintain a generally constant overall damping response during the time interval. Conversely, as the controller 10 increases active damping by increasing the amplitude of position changes of the motor 40 during the time interval (e.g., lead time interval), the controller 10 reduces the passive damping by reducing the pressure level within the internal chamber of the pneumatic shock absorber to maintain a generally constant overall damping response during an interval. The duration of the time interval (e.g., lead time interval) may depend upon whether the vibration of the seat 28 is continuous, whether the vibration of the seat 28 is intermittent, and the rate of decay of vibrational energy, for example. Further, during subsequent time intervals, following a time interval (e.g., lead time interval) with a generally constant overall damping response, the controller 10 may gradually decrease the passive damping, the active damping or both commensurate with (e.g., proportional to) the detected positional amplitude of vibrations and any decay of the amplitude over time.

Figure 2:
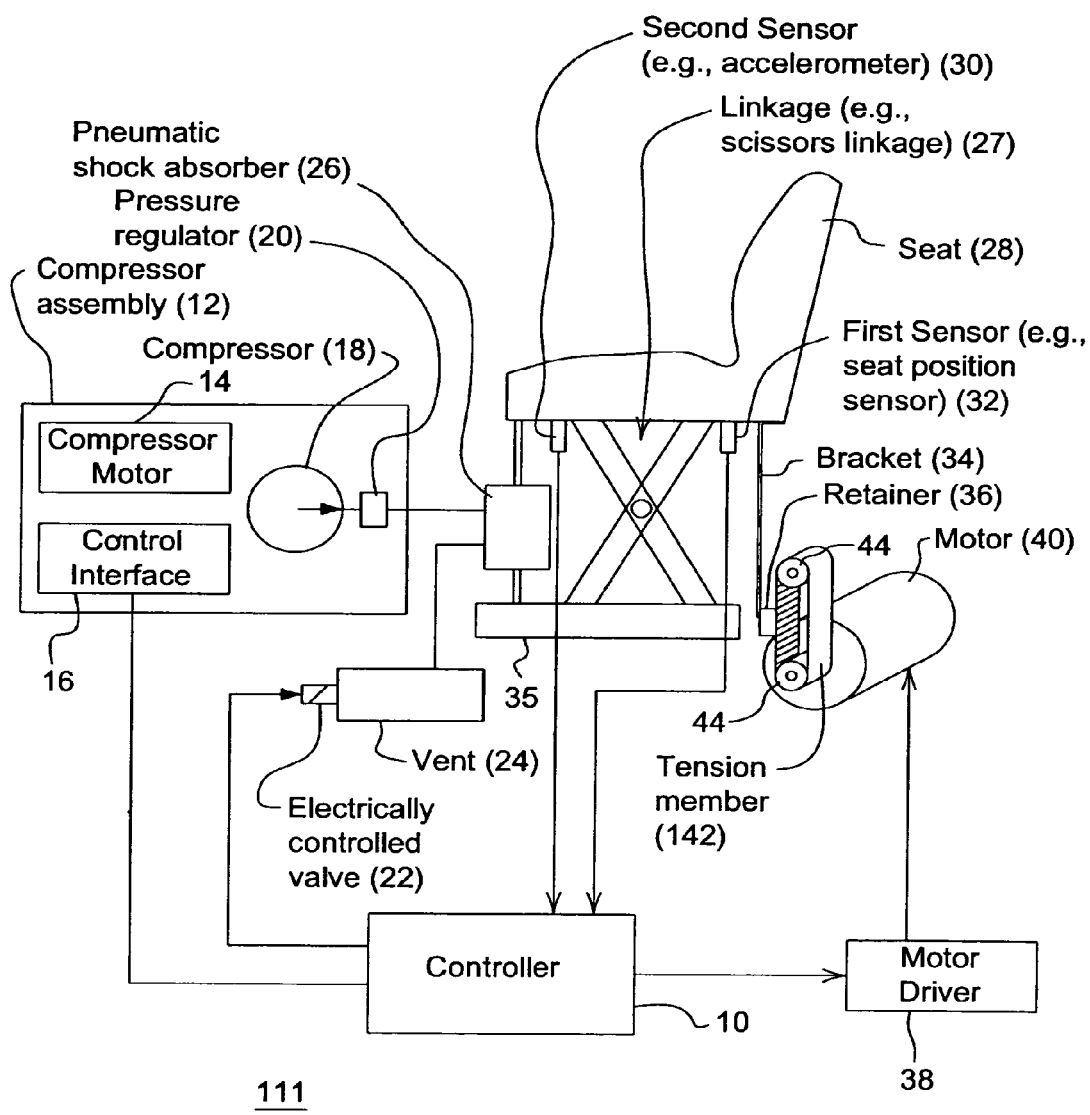
FIG. 2 is a second embodiment of a suspension system for a seat of a vehicle.

The suspension system 111 of FIG. 2 is similar to the suspension system 11 of FIG. 1, except the suspension system 111 of FIG. 2 uses two cylindrical members 44, as opposed to a three cylindrical members 44. Accordingly, the tension member 142 of FIG. 2 is strung between two cylindrical members 44 and has a generally linear profile. The tension member 142 may comprise a chain, a belt, a belt with teeth, a belt with cogs, or the like. Like reference numbers in FIG. 1 and FIG. 2 indicate like elements.

Figure 3:
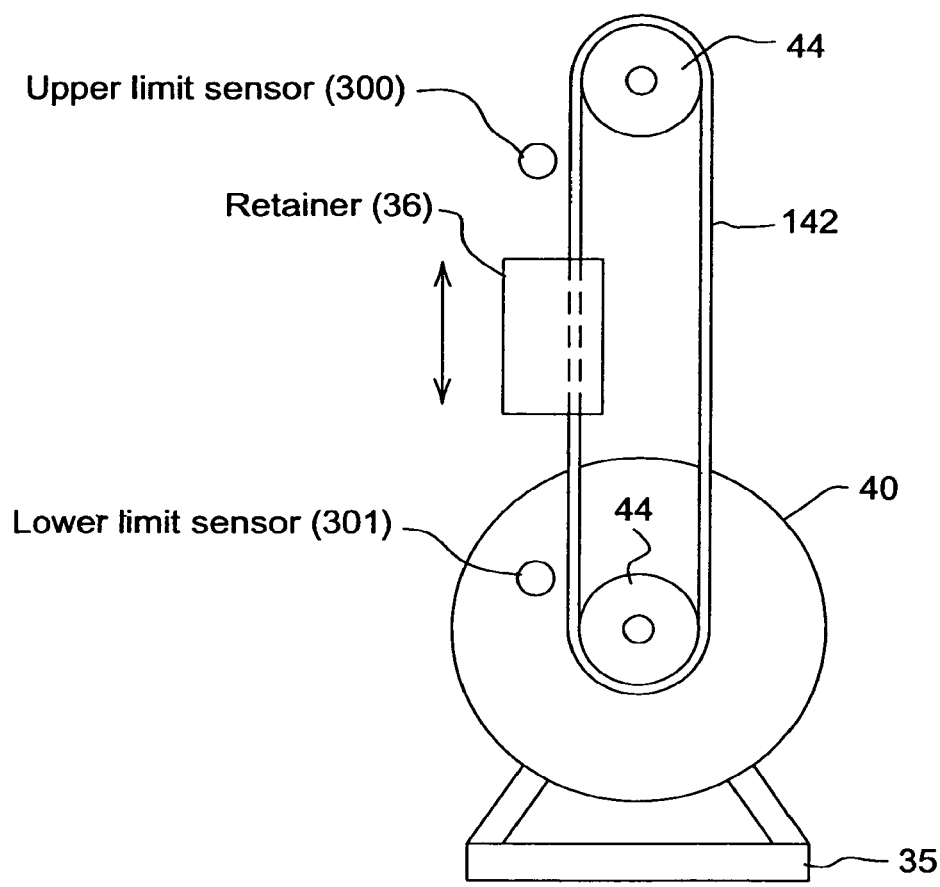
FIG. 3 shows the active compensation portion of the suspension system of FIG. 2.

The cylindrical member configuration of FIG. 3 is generally consistent with that of FIG. 2. However, the configuration of FIG. 3 shows a lower limit sensor 301 and an upper limit sensor 300 to bound the vertical movement of the tension member 142. The sensors (300, 301) each may comprise a contact sensor, an optical sensor, a magneto restrictive sensor, a magnetic sensor or the like. If the sensors (300, 301) are contact sensors, such sensors may be arranged such that contact with retainer (e.g., a top or bottom thereof) is detected. If the sensors are optical, the sensors may comprise a transmitter and a receiver, where the transmitter transmits a beam of electromagnetic radiation (e.g., infra-red, near-infrared ultraviolet, or other radiation) to the receiver such that interruption of the beam by the retainer 36 is detected.

The upper limit sensor 300 and the lower limit sensor 301 may be coupled to the controller 10 or the motor driver 38, for instance. Accordingly, if there is any slippage of the tension member 42 with respect to either cylindrical member 44, the rest position or home position of the tension member 42 may be reset or adjusted to compensate for any such slippage or misalignment. Further, the motor 40 may be disabled or prevented from going beyond the upper vertical limit associated with the upper limit sensor 300 or the lower vertical limit associated with the lower limit sensor 301.

Figure 4:
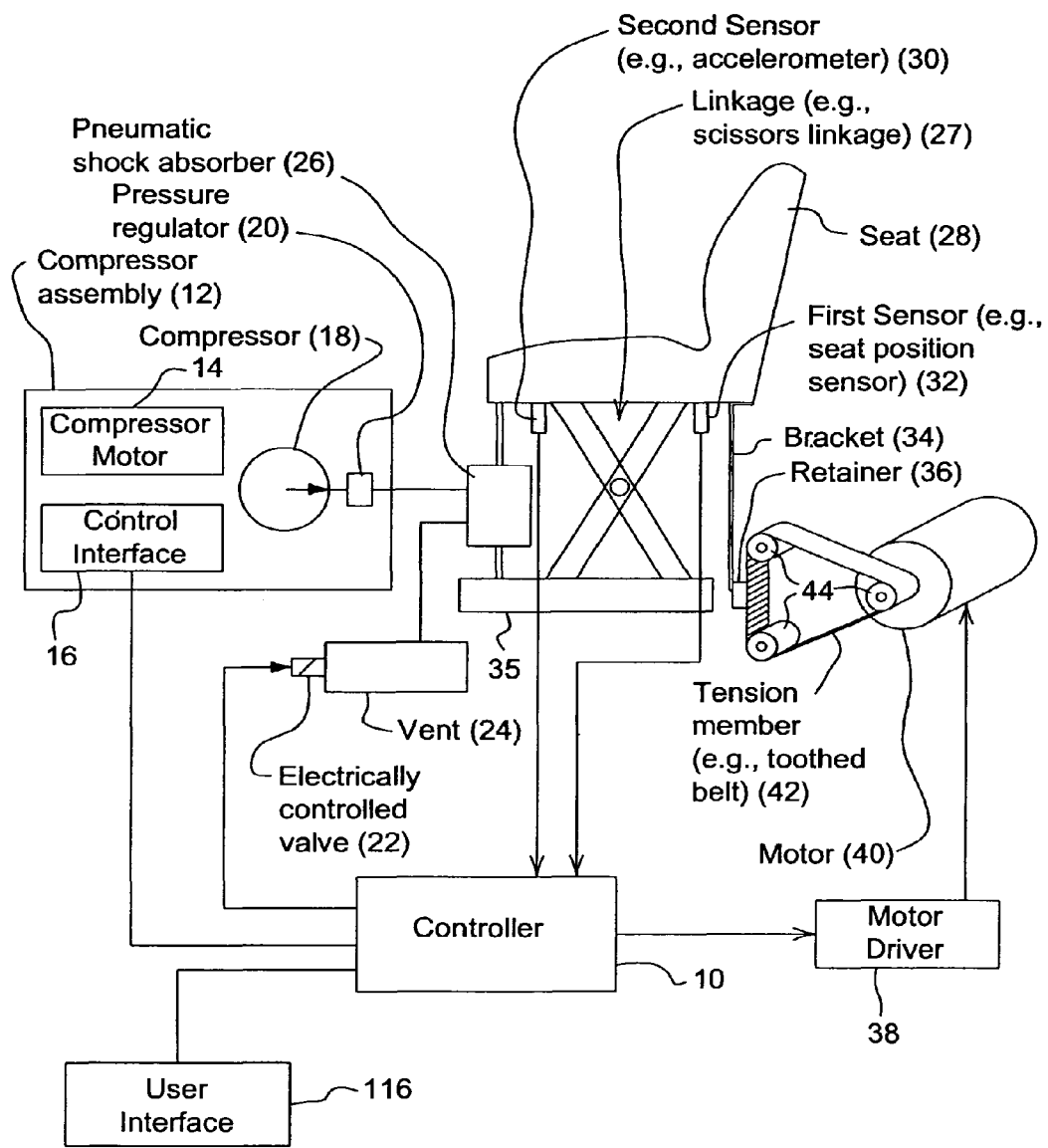
FIG. 4 is a third embodiment of a suspension system for a seat of a vehicle.

The suspension system 211 of FIG. 4 is similar to the suspension system 11 of FIG. 1, except the suspension system 211 of FIG. 4 further includes a user interface 116 coupled to the controller 10. The controller 10 may include an input/output port that supports the user interface 116. Like reference numbers in FIG. 1 and FIG. 4 indicate like elements.

The user interface 116 may comprise one or more of the following: a display (e.g., liquid crystal display), a keyboard, a keypad, a button, an electrical switch, a pointing device (e.g., an electronic mouse) to facilitate entry or selection of user input data or commands. For example, the combination of the user interface 116 and the controller 10 supports the operator's input of the operator weight data or prompts the operator for entry of his or her operator weight data into user interface 116 (e.g., upon starting of the vehicle). The user interface 116 provides the operator weight data to the controller 10 for determining or generating appropriate control signals for the control interface 16.

The controller 10 may select a desired pressure level associated with an operator weight (e.g., sensed operator weight) for the pneumatic shock absorber 26. For instance, the controller 10 may determine a control signal for the control interface 16 based on the selection of a desired pressure level associated with a corresponding entered operator weight from a look-up table, a database, or another data structure. The look-up table, database or other data structure may be stored in memory or data storage (e.g., non-volatile random access memory, semiconductor memory, a hard disk drive, a magnetic storage device or otherwise) associated with the controller 10.

The control interface 16 may set the desired pressure level of the interior chamber of the pneumatic shock absorber 26 to be generally proportional to a weight of an operator that occupies the seat 28. Further, in the embodiment of FIG. 4, the desired pressure level of the interior chamber of the pneumatic shock absorber 26 may remain generally constant for an entire session (e.g., a continuous work task or task in which the vehicle is not turned off or disabled) in which the operator uses the vehicle or until the pressure level is manually reset by an operator (e.g., a subsequent overriding entry into the user interface 116). Accordingly, for the suspension system 211 of FIG. 4, the controller 10 and the motor 40 provide dynamic compensation for vibration associated with the terrain or ground that the vehicle encounters, whereas the pneumatic shock absorber 26 provides generally constant dampening based on the operator's weight.

Figure 5:
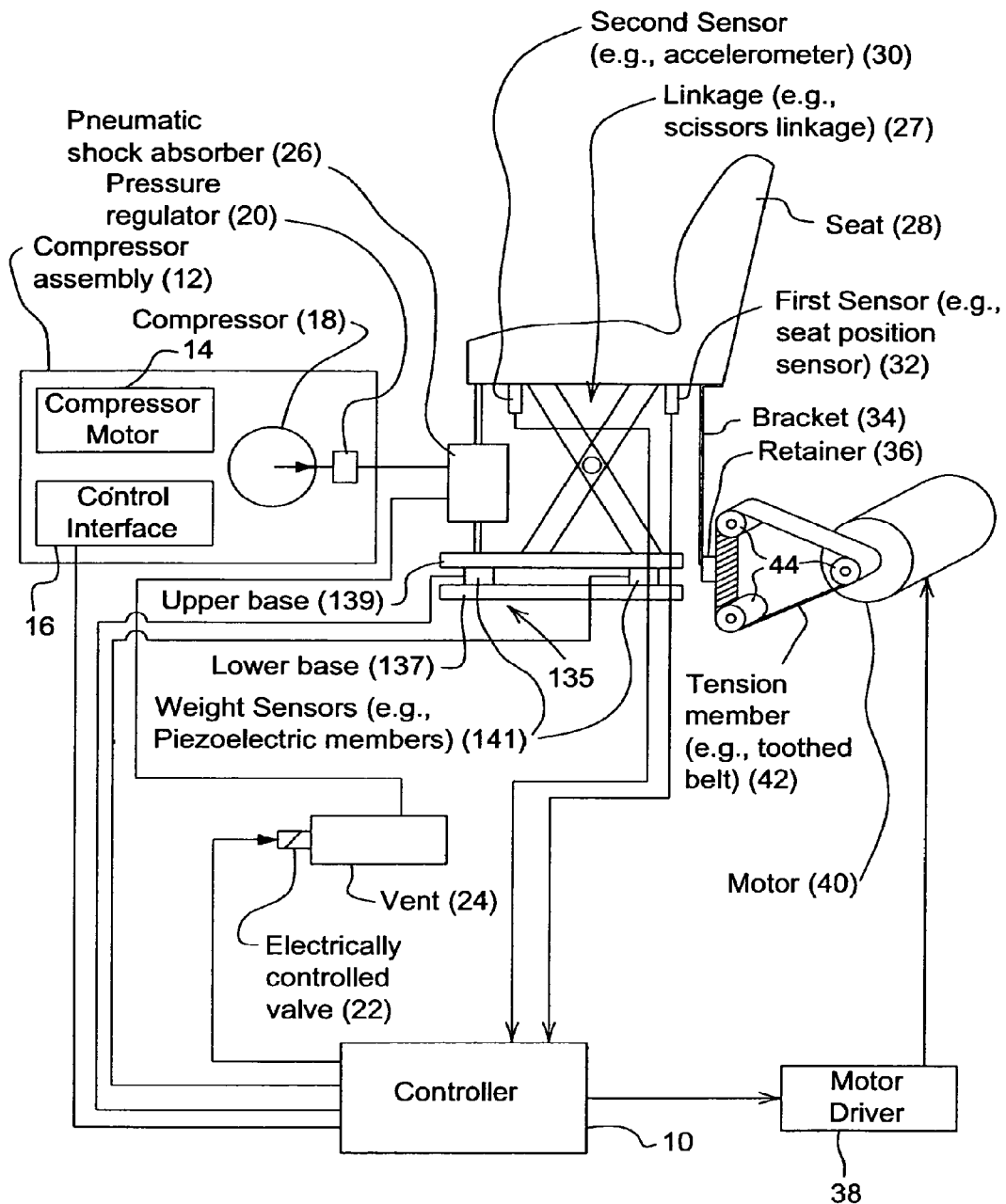
FIG. 5 is a fourth embodiment of a suspension system for a seat of a vehicle.

The suspension system 311 of FIG. 5 is similar to the suspension system 11 of FIG. 1, except the suspension system 311 of FIG. 5 replaces the base 35 with an enhanced base 135. Like reference numbers in FIG. 1 and FIG. 5 indicate like elements.

The enhanced base 135 includes one or more weight sensors 141 disposed between an upper base 139 and a lower base 137 to detect an operator weight of the operator when the operator is seated. The upper base 139 is spaced apart (e.g., vertically) from the lower base 137. The upper base 139 is associated with or operably connected to the linkage 27. In one embodiment, the weight sensors 141 comprise piezoelectric or piezoresistive members that provide an electrical signal or change in resistance in response to the application of force (e.g., compressive force) or the operator weight. The weight sensors 141 are directly or indirectly electrically coupled to the controller 10 to provide a signal representative of the operator weight of an operator of the vehicle. If the weight sensors 141 are capable of providing an analog signal output (e.g., voltage) proportional to the operator weight, the weight sensors 141 may feed an analog-to-digital converter (or the combination of an analog-to-digital converter and data storage (e.g., buffer memory or data latch)) disposed between the controller 10 and the weight sensors 141 to provide operator weight data as a digital output. If the weight sensor 141 provides a digital output or digital signal output indicative of the operator weight of an operator, the weight sensor 141 may be configured with an integral analog-to-digital converter and data storage circuit.

The controller 10 may select a desired pressure level associated with a sensed operator weight for the pneumatic shock absorber 26. For instance, the controller 10 may determine a control signal for the control interface 16 based on the selection of a desired pressure level associated with a corresponding sensed operator weight from a look-up table, a database, or another data structure. The look-up table, database or other data structure may be stored in memory or data storage (e.g., non-volatile random access memory, semiconductor memory, a hard disk drive, a magnetic storage device or otherwise) associated with the controller 10.

The controller 10 may instruct the control interface 16 to set the desired pressure level of the interior chamber of the pneumatic shock absorber 26 to be generally proportional to the operator weight of an operator that occupies the seat 28. Further, in the embodiments of FIG. 5, the desired pressure level of the interior chamber of the pneumatic shock absorber 26 may remain generally constant for an entire session in which the operator uses the vehicle or until the pressure level is reset by new sensor data from one or more weight sensors 141 (e.g., a subsequent reading upon starting of the vehicle). Accordingly, for the suspension system 311 of FIG. 5, the controller 10 and the motor 40 provide dynamic compensation for vibration associated with the terrain or ground that the vehicle encounters, whereas the pneumatic shock absorber 26 provides generally constant dampening based on the operator's weight.

Any of the embodiments of the vibration compensation method and system, disclosed herein, tend to reduce vibration perceived by the seated operator, to increase the comfort of the seated operator in operating over rough terrain and to reduce operator fatigue.

Having described the preferred embodiment, it will become apparent that various modifications can be made without departing from the scope of the invention as defined in the accompanying claims.

The invention claimed is:

1. A suspension system for a seat, the suspension system comprising:
   a linkage;
   a base coupled to the seat through the linkage;
   a pneumatic shock absorber providing a resistance level against movement of the seat with respect to the base;
   a sensor to detect a vibrational frequency associated with an instantaneous position of the seat versus time;
   an electric motor coupled to the seat to provide a corrective change of height of the seat in opposition to a vibration-induced change in the instantaneous position of the seat as determined by the vibrational frequency detected by the sensor, wherein the electric motor causes the seat to move upward or downward by a determined amplitude and at a determined time producing a compensation movement of the seat with a compensation frequency 180 degrees out of phase with the vibrational frequency detected by the sensor to actively dampen vibrations; and
   a controller configured to send, in response to the vibrational frequency detected by the sensor, at least one control signal to change the resistance level of the pneumatic shock absorber and to move the seat by the electric motor, wherein the electric motor provides active damping in response to vibrations transmitted from the vehicle traversing the ground and wherein the pneumatic shock absorber provides passive damping in response to the vibrations, wherein as the passive damping is increased by increasing the pressure level, the active damping by decreasing the amplitude of position changes during a time interval.

2. The suspension system of claim 1, wherein the resistance level is based on a corresponding pressure level of air or gas within the pneumatic shock absorber.

3. The suspension system of claim 1, further comprising:
   a second sensor to detect data associated with an instantaneous velocity of the seat.

4. The suspension system of claim 1, further comprising:
   a second sensor to detect data associated with an instantaneous acceleration of the seat.

5. The suspension system of claim 1, wherein the compensation movement of the seat by the electric motor is disabled for a period of time during a measurement of a downward displacement of the seat as an operator is seated on the seat.

6. A suspension system for a seat, the suspension system comprising:
   a linkage;
   a base coupled to the seat through the linkage;
   a pneumatic shock absorber providing a resistance level against movement of the seat with respect to the base;
   a sensor to detect a vibrational frequency associated with an instantaneous position of the seat versus time;
   an electric motor coupled to the seat to provide a corrective change of height of the seat in opposition to a vibration-induced change in the instantaneous position of the seat as determined by the vibrational frequency detected by the sensor, wherein the electric motor causes the seat to move upward or downward by a determined amplitude and at a determined time producing a compensation movement of the seat with a compensation frequency 180 degrees out of phase with the vibrational frequency detected by the sensor to actively dampen vibrations; and
   a controller for sending a control signal in response to the data to change the resistance level of the pneumatic shock absorber, wherein the controller adjusts a ratio between passive damping and active damping to maintain a constant overall damping response during a time interval by increasing the resistance level within the pneumatic shock absorber and decreasing an amplitude of position changes of the electric motor or by decreasing the resistance level within the pneumatic shock absorber and increasing the amplitude of the position changes of the electric motor.

7. A suspension system for a seat, the suspension system comprising:
   a linkage;
   a base coupled to the seat through the linkage;
   a pneumatic shock absorber providing a resistance level against movement of the seat with respect to the base;
   a sensor to detect a vibrational frequency associated with an instantaneous position of the seat versus time;
   an electric motor coupled to the seat to provide a corrective change of height of the seat in opposition to a vibration-induced change in the instantaneous position of the seat as determined by the vibrational frequency detected by the sensor, wherein the electric motor causes the seat to move upward or downward by a determined amplitude and at a determined time producing a compensation movement of the seat with a compensation frequency 180 degrees out of phase with the vibrational frequency detected by the sensor to actively dampen vibrations; and
   a controller configured to send, in response to the vibrational frequency detected by the sensor, at least one control signal to change the resistance level of the pneumatic shock absorber and to move the seat by the electric motor, wherein the electric motor provides active damping in response to vibrations transmitted from the vehicle traversing the ground and wherein the pneumatic shock absorber provides passive damping in response to the vibrations wherein the sum of the active damping and passive damping remains generally constant for a time interval.

8. The suspension system according to claim 1 wherein as the passive damping is reduced by decreasing the pressure level, the active damping is increased by increasing the amplitude of position changes during another time interval.

* * * * *